Oct. 20, 1970  F. I. SEAMAN  3,534,853
AUTOMATIC TESTING AND SORTING APPARATUS FOR ELECTRICAL ELEMENTS
Filed April 29, 1968  6 Sheets-Sheet 3
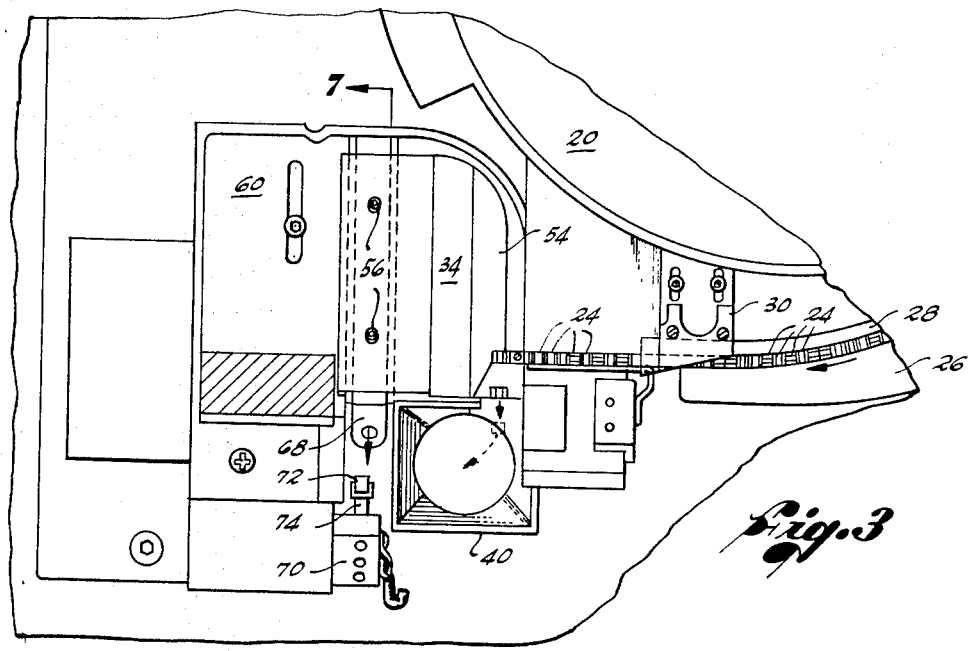
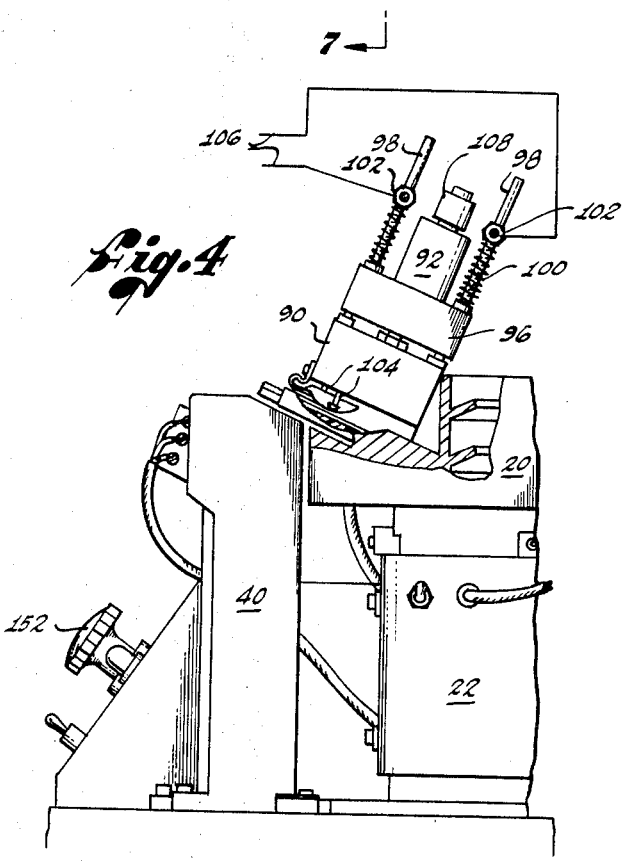
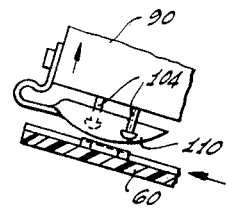
INVENTOR.
FOREST I. SEAMAN
BY Perry E. Turner
ATTORNEY Oct. 20, 1970     F. I. SEAMAN     3,534,853
AUTOMATIC TESTING AND SORTING APPARATUS FOR ELECTRICAL ELEMENTS
Filed April 29, 1968     6 Sheets-Sheet 4

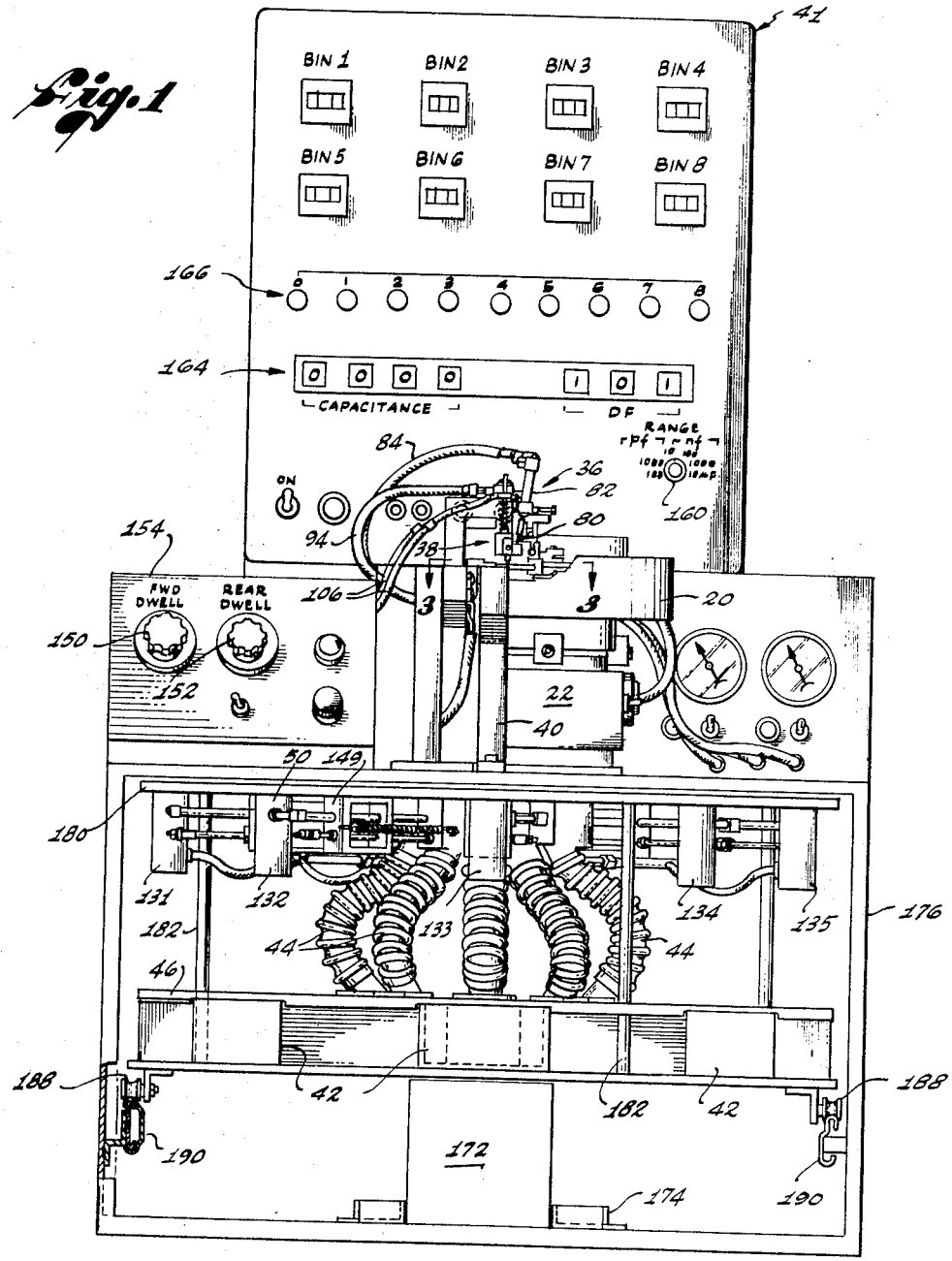

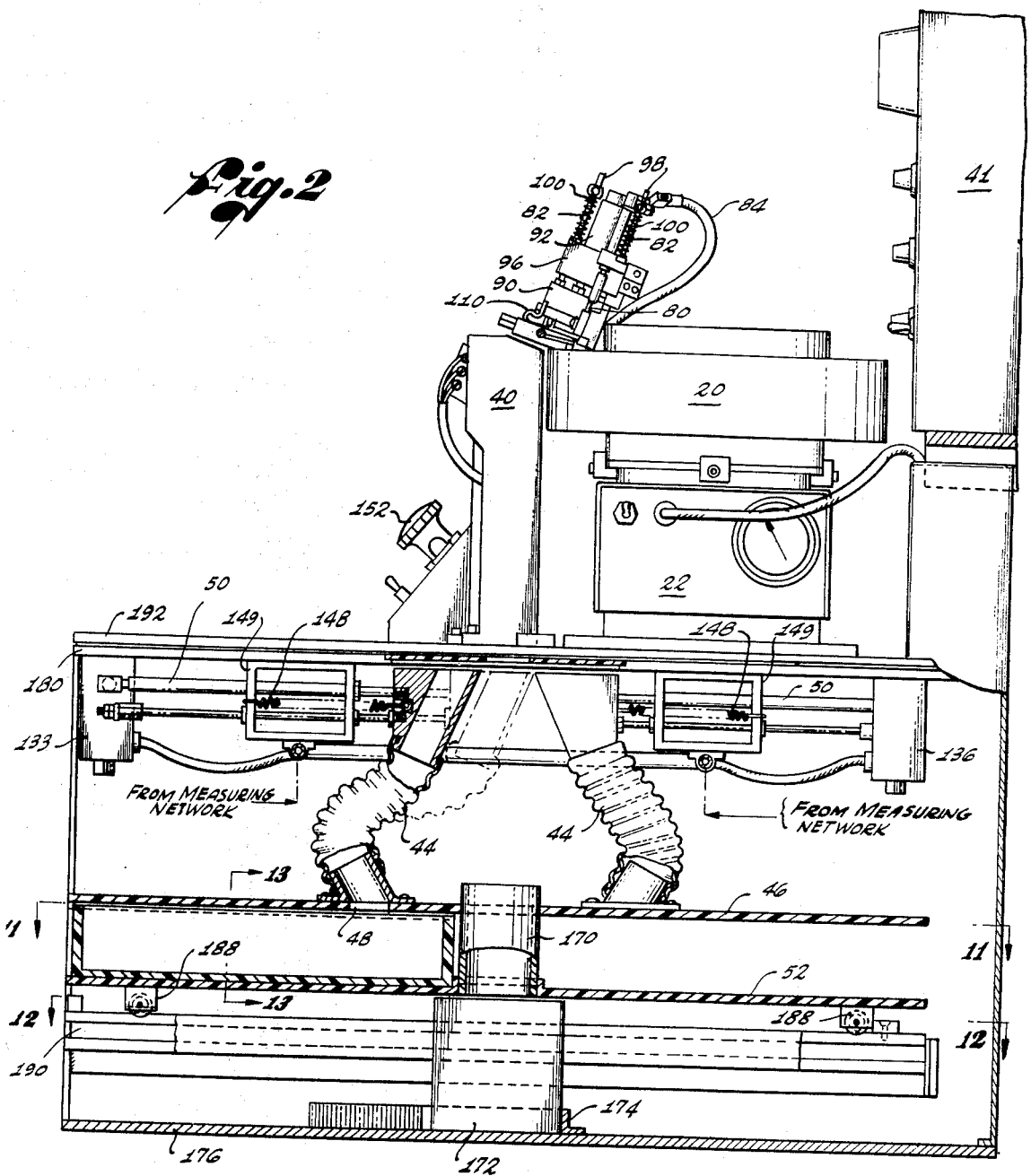

INVENTOR.
FOREST I. SEAMAN
BY Perry E. Turner
ATTORNEY

Oct. 20, 1970　　　　　　　　F. I. SEAMAN　　　　　　　　3,534,853
AUTOMATIC TESTING AND SORTING APPARATUS FOR ELECTRICAL ELEMENTS
Filed April 29, 1968　　　　　　　　　　　　　　　　6 Sheets-Sheet 5
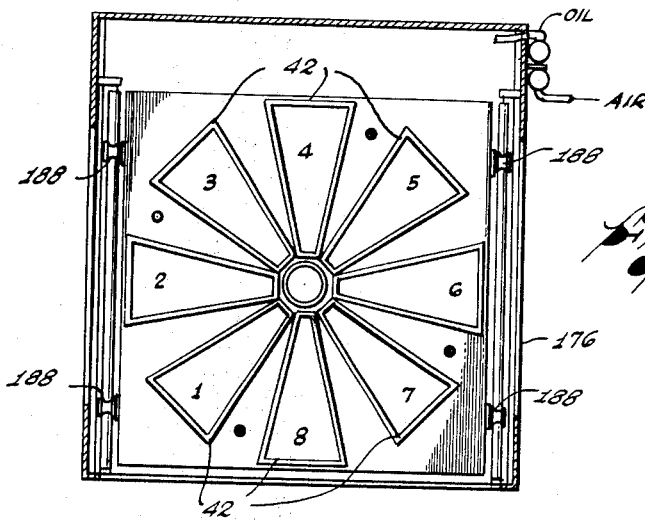
Fig. 11
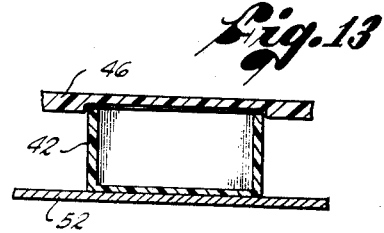
Fig. 13
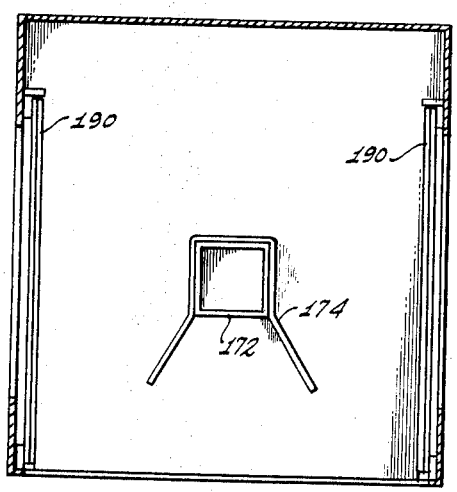
Fig. 12
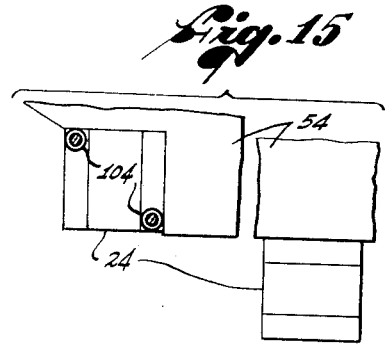
Fig. 15
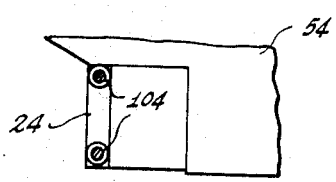
Fig. 17
Fig. 16
INVENTOR.
FOREST I. SEAMAN
BY Perry E. Turner
ATTORNEY

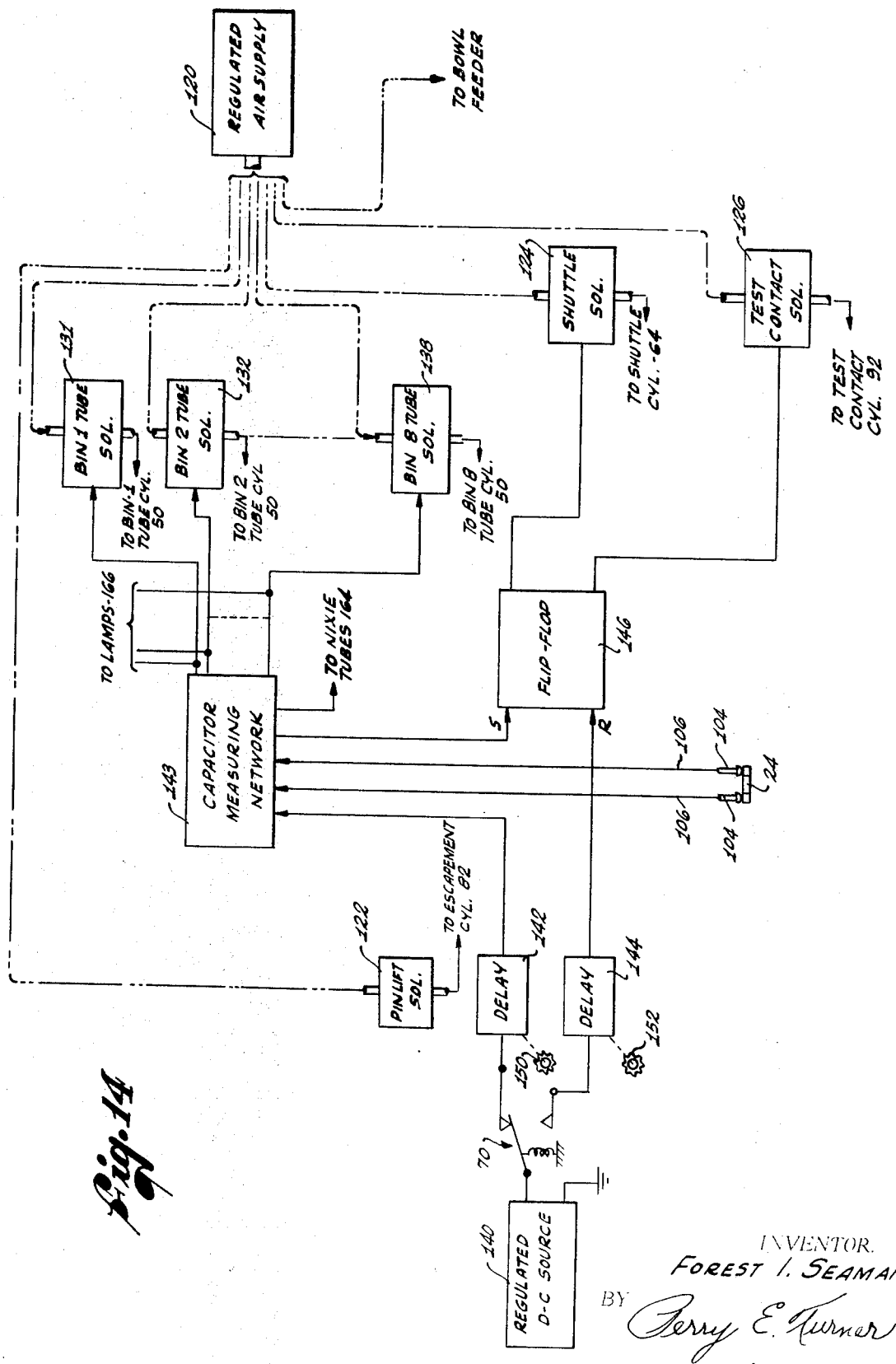

United States Patent Office 3,534,853
Patented Oct. 20, 1970

1

3,534,853
AUTOMATIC TESTING AND SORTING APPARATUS FOR ELECTRICAL ELEMENTS
Forest I. Seaman, Northridge, Calif., assignor to San Fernando Electric Manufacturing Co., San Fernando, Calif., a corporation of California
Filed Apr. 29, 1968, Ser. No. 724,825
Int. Cl. B07c 3/12
U.S. Cl. 209—73                              18 Claims

ABSTRACT OF THE DISCLOSURE

A vibration feeder bowl conveys ceramic capacitors single file to a shuttle, which moves one capacitor at a time beneath retractable test contacts. The contacts seat on the capacitor electrode coatings, and electronic measuring means develops signals representing its electrical characteristics. The next succeeding capacitor moved by the shuttle pushes the tested one into a chute, from which it drops into a tube that has been moved below the chute, and through which it passes into a bin. There are several bins, each with a respective tube, and the magnitude of the signal generated determines which tube and bin receives the tested capacitor.

BACKGROUND OF THE INVENTION

Field of the invention

This invention relates to ceramic capacitors, and more particularly to novel means for automatically handling, testing and sorting such capacitors.

Description of the prior art

As is well known, ceramic capacitors of the same production run do not exhibit uniform characteristics. Where it is necessary to have capacitors with substantially the same characteristics, it is necessary to test all of them and segregate them according to their characteristics, e.g., capacitance, dissipation factor and the like. Heretofore, such testing has been done by manually placing test circuit contacts on the conductive coatings of each capacitor, thereby to place the capacitor in circuit with electronic means for measuring its characteristics, and then manually placing the tested capacitor into an appropriate bin. Inevitably, such manual operations necessitate undesirably high sales prices for such capacitors and products in which they are incorporated.

SUMMARY OF THE INVENTION

This invention embraces cooperative means for automatically conveying electrical elements singly to a test station, testing each element, and directing each tested element to a respective one of separate storage locations in accordance with its characteristics. In this manner, the expense, loss of time and mistakes inherent in manual testing and sorting procedures are eliminated.

BRIEF DESCRIPTION OF THE DRAWINGS

FIG. 1 is a front elevation view of the capacitor testing and sorting apparatus in acordance with the invention;

FIG. 2 is a side elevation view of the apparatus of FIG. 1;

FIG. 3 is an enlarged, fragmentary plan view of the portion of the apparatus taken along the line 3—3 of FIG. 1, to show more clearly the arrangement of parts for feeding capacitors to test position and thence through the chute, and simultaneously operating the microswitch in the path of the shuttle;

FIG. 4 is an enlargement of the portion of FIG. 2 showing more clearly the arrangement of the test contact mechanism;

FIGS. 5 and 6 are enlarged, fragmentary elevation views of the lower portion of the test contact mechanism, showing more clearly the cooperative operations of the asociated parts;

FIG. 11 is a top plan view of the arrangement of bins, taken along the line 11—11 of FIG. 2, to which tested capacitors are selectively directed in acordance with their measured characteristics;

FIG. 12 is a top plan view of the center bin taken along the line 12—12 of FIG. 2;

FIG. 13 is a fragmentary sectional view taken along the line 13—13 of FIG. 2, showing how the bins of FIG. 11 are releasably held in place;

FIG. 14 is a block diagram of the electrical control system for the solenoid valves used to control the pneumatic operations of the escapement mechanism, the shuttle plate, the test contact support, and the tubes for the various bins, and showing schematically the air connections to and from the various solenoids; and FIGS. 15–17 are fragmentary plan views like FIG. 10, to aid in explaining the pairing of associated parts for testing chips of different sizes, and for explaining the advantageous arrangement of test contacts.

DESCRIPTION OF THE PREFERRED EMBODIMENT

Figure 7:
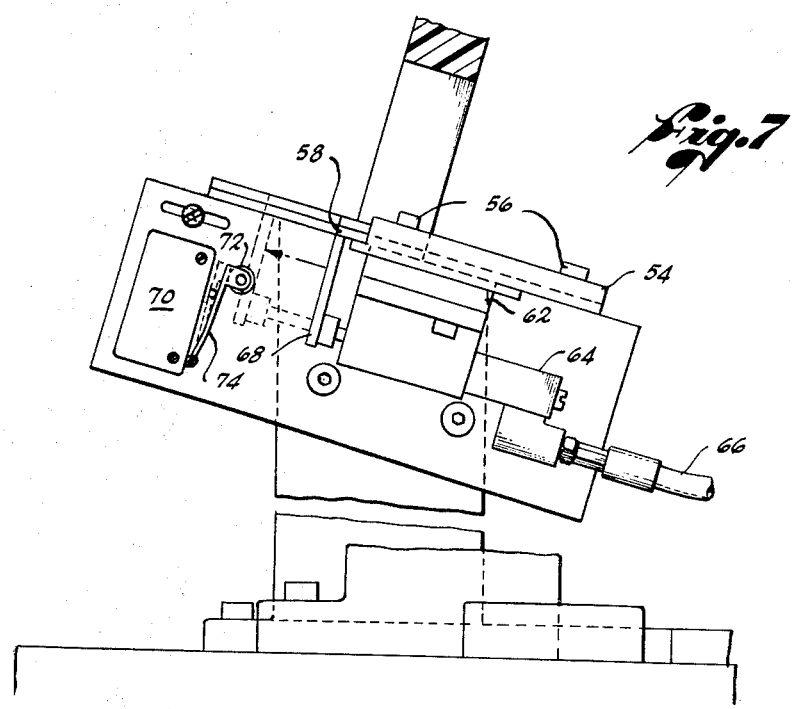
FIG. 7 is a side elevation view taken along the line 7—7 of FIG. 3.
Figure 8:
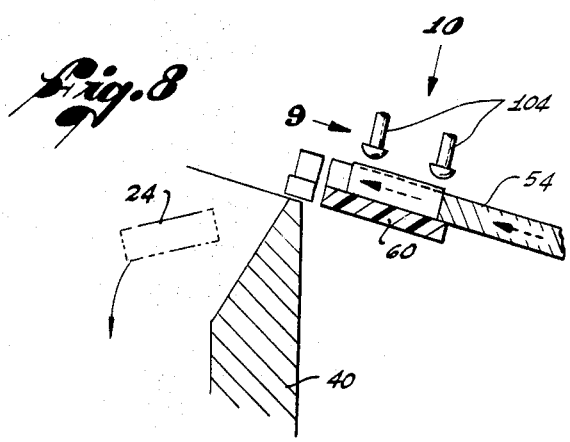
FIG. 8 is a simplified schematic representation of a capacitor moved to test position by the shuttle plate.

Referring to FIGS. 1 and 2, there is shown a feeder bowl 20 into which a quantity of capacitor chips to be tested is placed. The bowl 20 is of the type having a spiral ramp along its inner wall extending from its floor to its upper end. The bowl 20 is supported on a vibrator unit 22, which in operation causes the chips in the bowl 20 to move in one direction along the ramp, i.e., from the floor to the top of the bowl.

FIG. 3 illustrates chips 24 emerging from the top of the bowl 20. In this connection, the chips 24 are caused to move in single file along a plate 26 and against a rib 28 at the top of the bowl. As illustrated, the chips 24 are ceramic capacitors which are coated at opposite edges to which respective embedded plates extend. The chips 24 pass under a plate 30, which is adapted to be releasably secured in a position such that the space between the confronting surfaces of the plates 26, 30 insures that only those chips which lie flat will pass beneath the plate 30. As shown, the outer edge of the plate 30 is inclined outwardly. Thus, chips which pile up and are not properly oriented are caused to move along the outer edge of the plate 30 and off the plate 26 and these are returned to the bowl.

The chips 24 which emerge past the plate 30 move towards a shuttle 34. Adjacent the shuttle is an escapement mechanism 36 which operates to permit only one chip at a time to move into the path of the shuttle. Each such chip is carried to a position beneath a test contact mechanism 38 adjacent the top of a chute 40, where its characteristics are measured by an electronic measuring network contained in a housing 41 (see FIGS. 1 and 2). The next succeeding chip 24 brought to the test position moves the previously tested capacitor and causes it to drop into the chute 40.

Referring to FIGS. 1, 2, 11 and 13, a chip dropped into the chute 40 is directed to one of a number of bins 42, here shown by way of example as eight bins numbered 1, 2 . . . 8. For each of the bins 42 there is provided a respective conveyor tube 44, the lower end of which is fixed to a horizontal plate 46 adjacent an opening 48 into a respective bin 42. The upper end of each tube 44 is horizontally movable, and is carried on the inner end of a piston of an air cylinder 50. The bins rest on a horizontal plate 52. To permit the bins to be guided into position and to prevent their lateral movement, the lower surface of the plate 46 is shown to be undercut or grooved (see FIG. 13) to slidably receive the upper portions of the bins.

A tested chip causes a signal to be generated by the measuring apparatus 40 which represents the characteristics of that chip. In accordance with such signal, a respective one of the cylinders 50 is actuated, whereupon the upper end of its associated tube 44 is horizontally moved to a position directly beneath the chute 40. Accordingly, when that chip falls into the chute, it passes through the tube 44 that is aligned with the chute, and thence into the associated bin 42.

In the preferred embodiment of the invention, respective electrically controlled pneumatic means are also employed for operating the escapement mechanism 36, the shuttle 34, and the test contact mechanism 38. For the shuttle, and referring to FIGS. 3 and 7, a plate 54 is releasably secured at 56 to a plate 58 that is slidably mounted on a base plate 60. Another plate 62 integral with the plate 58 extends downwardly through a slot in the base plate 60, where it is attached to the piston of a cylinder 64 that is coupled to an air line 66. By this means, air admitted to the cylinder 64 causes the shuttle to move forward, and cutting off air to the cylinder causes the shuttle to retract. The shuttle is normally retracted, as by spring biasing. Appropriate limit stops may be provided for the retracted and forward positions of the shuttle, and may be constituted of the ends of the slot through which the plate 62 extends.

The forward edge of the plate 58 carries a downwardly extending arm 68 which, in the forward position of the shuttle actuates a microswitch 70. For this purpose, a roller 72 is mounted on the end of a lever 74 that is adapted to depress the normally outwardly biased plunger of the switch 70. As will be seen, the switch 70 is included in an electrical control circuit that determines the sequence of operations of the parts heretofore described.

Figure 9:
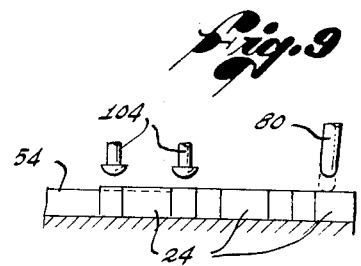
FIG. 9 is a simplified schematic representation, taken in the direction indicated by the arrow 9 in FIG. 8, showing the next succeeding capacitor in position to pass into the path of the shuttle plate on its next succeeding return movement, and showing the pin of the escapement mechanism in position to prevent movement of any other capacitors toward the shuttle plate.

For the escapement mechanism 36, and referring to FIGS. 1, 2 and 9, a pin 80 is provided on the lower end of the piston of an air cylinder 82 to which an air line 84 is connected. When the pin 80 is in its down position, it engages the upper surface of a chip 24 directly beneath it. In this position, the pin holds the line of chips 24 against movement toward the shuttle. When the pin 80 is raised, the line of chips is released for movement towards the shuttle. In this example, operation of the pin 80 is so timed that it comes to rest on each chip passing thereunder. In this manner, only one chip at a time is free to pass into the path of the shuttle.

The test contact mechanism 38 (see FIGS. 1, 2 and 4–6) includes a lower insulating block 90 that is carried by the piston of an air cylinder 92 to which an air line 94 (FIG. 1) is connected. In this arrangement, the cylinder 92 sets on a stationary block 96, and its piston extends through the block 96 to the block 90. A pair of metal rods 98 slidably extend through the block 96 and engage contact pins embedded in the upper surface of the block 90. The rods 98 are normally biased upwardly via springs 100 which extend between the upper surface of the blocks 96 and collars 102 which are secured to the rods 98.

Embedded in the lower surface of the block 90 are contacts 104, which are connected via wires extending through the block to the aforementioned pins. Electrical connections 106 are conductively secured at one end to the collars 102, and are thus conductively connected to the contacts 104. As shown, the contacts 104 extend below the lower surface of the block 90. The spacing of the contacts 104 is such as to permit them to engage the conductive coatings on a capacitor chip located directly beneath the contacts.

The above-described arrangement is one in which the springs 100 normally bias the rods 98, and hence the block 90 and contacts 104, to an uppermost position. With the contacts 104 in their upper position, the shuttle can move a chip into position directly beneath the contacts. FIG. 5 shows the shuttle plate 54 moved forward to place a chip 24 directly beneath the contacts 104.

Immediately upon the chip 24 being placed beneath the contacts 104, as in FIG. 5, the contact support block 90 is lowered (by supplying air to the cylinder 92 via the air line 94 and the fitting 108 on top of the cylinder 92), and thereupon the chip 24 is held against the base plate 60 and then engaged by the contacts 104. In this connection, the portion of the base plate 60 against which the chip is held is nonconductive, so as not to create a short between the conductive coatings of the chip. For this purpose, the base plate may include a plastic element 60' along which the chip is moved by the shuttle.

To hold the chip in position, there is provided a thin plate 110 extending between the contacts 104, and which is secured at one end to the block 90 via a spring connection 112. In the upper position of the block 90 (FIG. 5), the lower edge of the plate 110, which preferably is curved, extends below the lower ends of the contacts 104. When the shuttle plate 54 positions a chip 24 beneath the contacts 104, the block 90 is lowered as the shuttle plate 54 is retracted, and substantially simultaneously the lower edge of the plate 110 engages the upper surface of the chip 24. Thus, the plate 110 holds the chip 24 in the position to which the shuttle plate 54 moved it, as the block 90 continues its downward movement to bring the contacts 104 against the metallic coatings on the chip.

As previously indicated, the sequence of operations of the above-described mechanisms is electrically controlled. In the preferred embodiment, the cylinders 50 for the sorter tubes 44, the cylinder 82 for the pin 80 of the escapement mechanism, the cylinder 64 for the shuttle mechanism, and the cylinder 92 for the test contact mechanism are operated through electrically controlled air solenoid valves. Referring to the schematic representations in FIG. 14, a regulated air supply source 120 is shown as connected to a pin lift solenoid valve 122, the outlet of which is connected to the escapement cylinder 82; to a shuttle solenoid valve 124, the outlet of which is connected to the shuttle control cylinder 64; to a test contact solenoid valve 126, the outlet of which is connected to the test contact mechanism cylinder 92; and to the coils of solenoid valves 131, 132 . . . 138 for the sorter tubes, the outlets of which are connected to the respective tube cylinders 50.

The switch 70 in FIG. 14 is illustrated as a single-pole, double-throw switch having its movable contact connected to a regulated D.-C. source 140. The movable contact of the switch 70 is normally biased against one of its fixed contacts, to which the coil of the pin lift solenoid 122 is connected. The solenoid 122 is thus normally energized, and in this energized condition admits air to the cylinder 82 to hold the pin 80 down against the chip that is located beneath it.

As shown, the same fixed contact of the switch 70 is connected through a delay network 142 to the capacitor measuring network 143 that is contained in the housing 41. The other fixed contact of the switch 70 is connected through a similar delay network 144 to the reset terminal, designated R, of a flip-flop 146.

The capacitor measuring network 143 has an output connection to the set, or S, terminal of the flip-flop 146. The flip-flop 146 is a conventional bistable switching device and has two outputs, to one of which is connected the coil of the shuttle solenoid 124, and to the other of which is connected the coil of the test contact solenoid 126. Typically, the flip-flop 146 operates to cause the shuttle and test contact solenoids to be alternately energized. Thus, the test contact solenoid 126 is energized when the flip-flop is in its reset state. When a voltage of sufficient level applied to the set (S) input of the flip-flop, its state is changed to simultaneously cause the shuttle solenoid 124 to be energized and the test contact solenoid 126 to be deenergized. Similarly, when a voltage of sufficient level is next applied to the R input of the flip-flop, its state is again changed to cause the shuttle solenoid 124 to be deenergized and the test contact solenoid 126 to be energized.

The capacitor measuring network 143 is illustrated with respective output connections to the coils of the sorter tube solenoids 131, 132 . . . 138. The network 143 measures the characteristics of each capacitor chip 24 placed beneath the test contacts 104, and in response to the voltage levels representative of such characteristics, such network selectively energizes one of the solenoids 131, 132 . . . 138, whereby the associated sorter tube is actuated, as previously described, to receive the tested capacitor and direct it to its bin. The sorter tube solenoids dwell beneath the chute 40 sufficiently, as by mechanical and electrical inertia, to receive the chips pushed into the chute. Return of the sorter tubes is effected in the illustrated arrangement by tension springs 148 extending between the tubes and fixed brackets 149.

In this latter connection, FIG. 14 shows a capacitor chip 24 with the test contacts 104 on the conductive coatings thereof, and with the contact leads 106 connected to the capacitor measuring network 41, wherein, for example, the chip is included in a bridge. Within the network 143, suitable means, including a source of A.-C. voltage of predetermined magnitude and frequency applied across the chip through the leads 106, are provided for developing voltages of magnitudes corresponding to the capicitances of successive chips 24 placed beneath and contacted by the test contacts 104. As is apparent, such voltage levels are analogs of the measured characteristics, and preferably the network 143 has suitable A.-C. to D.-C. and analog-to-digital conversion means, and digital comparison means, for causing the sorter tube solenoids to be selectively energized.

Regarding the measuring network 143, it suffices for the present description to describe its functions generally, and it will be understood that this invention embraces other means for effecting automatic or semi-automatic operations of the various parts above described. As for the functions mentioned for the measuring network, details of circuitry for carrying out such functions are omitted for the sake of simplicity of description. Such circuitry as is needed is well known to those skilled in digital techniques and circuit arrangements and operations. In fact, such persons can readily devise various circuit arrangements which are suitable to carry out each function.

When the system is initially turned on (no capacitor chip beneath the test contacts 104), at which time only the pin lift solenoid 122 is energized, the network 41, following a predetermined delay, derives a voltage that is outside the range required to cause any of the sorter tube solenoids to be energized. Nevertheless, at the end of such measurement the network 143 applies an input voltage to the S input of the flip-flop and causes the shuttle solenoid 124 to be energized. The shuttle is thus operated, whereupon the movable contact of the switch 70 disconnects the pin lift solenoid 122 from the D.-C. source 140, and couples the R input of the flip-flop to the source through the delay network 144. Accordingly, the shuttle solenoid 124 is deenergized and the test contact solenoid 126 is energized. This sequence of operation continues, without energizing any of the sorter tube solenoids 131, 132 . . . 138, until the second chip 24 is moved to test position by the shuttle. Thereafter, the network 143 develops voltages representing the characteristics of capacitors successively placed beneath the test contacts 104, and energizes a selected one of the sorter tube solenoids depending upon the values of the measured characteristics of the immediately preceding chips.

At this point, reference is made to the delay networks 142, 144, and the manner in which they cooperate to main-main synchronization of the various electrical and mechanical operations. To aid in this understanding, reference, is made to FIG. 9 along with FIG. 14. In FIG. 9, the shuttle 54 is shown in its forward position to which it has moved one chip 24, the pin 80 is in its raised position wherein a next succeeding chip 24 has moved against the rear edge of the shuttle 54, and the contacts 104 are raised. It is desired that when the shuttle 54 moves to its forward position, it dwells there to insure that the chip moved therewith pushes the preceding chip off and into the chute and permits the chip under the lifted pin 80 to move next to the rear edge of the shuttle. Further, it is desired that when the shuttle plate 54 moves to its rear position, it dwells there sufficiently to permit the next succeeding chip to move into the position to be engaged and moved by the shuttle. Still further, it is desired that before the next succeeding stroke of the shuttle, there be a sufficient delay to permit the network 143 to measure the characteristics of the preceding capacitor chip 24 and effect operation of the appropriate sorter tube solenoid simultaneously with shuttle action. In short, on each forward stroke of the shuttle, a sorter tube is moved beneath the chute to receive the capacitor chip that was moved to test position in the preceding stroke of the shuttle.

As will now be seen, when the switch 70 is operated by forward movement of the shuttle to connect the D-C source 140 to the delay network 144, such network 144 delays operation of the test contact solenoid 126 sufficiently to permit the shuttle to dwell in its forward position the desired amount of time. Immediately upon the test contact solenoid 126 being energized, the shuttle solenoid 124 is deenergized, whereupon the shuttle starts its return movement and the switch 70 immediately connects the pin lift solenoid 122 to the D-C source 140. Due to the delay provided by the network 142, the characteristics of the capacitor chip 24 tested through the contacts 104 are measured by the measuring network 143 to connect the appropriate sorter tube solenoid to be energized simultaneously with the next operation of the shuttle solenoid 124.

In the illustarted arrangement, the measuring network 143 is adapted to cycle in response to the voltage via the delay 142 to make a measurement across the contacts 104, actuate the appropriate sorter tube solenoid (or none of them) and set the flip-flop 146 for energizing the shuttle solenoid 124. The operation of the digital circuitry employed for these purposes may be appropriately timed and sequenced.

As for operating the sorter tube solenoids 131–138, different known values of capacitance, in terms of voltage pulses or bits, are used in calibrating the logic circuits in the measuring network 41. In the present example, eight such standards are used for each run of chips to be tested. (The standards vary, of course, for production runs of chips of different sizes and capacitance values.) For each such standard, a respective sorter tube solenoid is energized. For any chip under test, therefore, the range of the number of pulses developed therefrom is determinative of the sorter tube solenoid that is energized.

For any such measuring network, suitable range selection means may be provided on the control panel, such as the range selection knob 160 shown in FIG. 1 adjacent appropriate range indicia provided on the front panel. For each range, of course, the measuring network includes respective circuits for measuring chips which exhibit capacitance values in the range. Also, for each such distinct range, respective logic circuits are calibrated with a respective set of standards. Also shown in FIG. 1 are respective thumb wheel devices 162 to be adjusted to provide a visual display of capacitance values of chips to go into identified bins.

In addition, the front panel may include a row of lamp bulbs 164, as of so-called Nixie tubes, which are operated by the measuring network to display the actual capacitance readings of each capacitor under test. Still further, the panel may include a display of a number of lamp bulbs 166, one for each bin, which is illuminated simultaneously with operation of the associated sorter tube solenoid. One such bulb 166 is also shown next to a "0" indicium, and its illumination signifies that none of the sorter tube solenoids is energized, i.e., where there is no chip under test and where chips under test have capacitance values outside the selected range.

In this latter connection, means are provided for collecting chips which pass into the chute 40, but which do not enter a sorter tube. Referring to FIGS. 1, 2 and 12, the plates 46, 52 have aligned openings within which a vertical tube 170 is supported directly beneath the lower end of the chute 40, and a bin 172 is positioned beneath the lower end of the tube 170. As shown, the bin 172 is supported in a guide element 174 that is secured to the floor of a supporting frame 176.

For convenience, and referring to FIGS. 1, 2, 11 and 12, the plate 52 forms the bottom of a movable unit which can be pulled out of the frame 176 to permit the bins 42 to be removed, emptied and replaced, and to permit easy access to the cylinders 50, solenoids 131–138, sorter tubes 44 and other associated parts for maintenance purposes. To this end, the solenoids 131–138 are secured to the lower surface of a plate 180 which is spaced above and secured to the plate 52, as by spaced rigid rods 182. Also secured to the underside of the plate 180 are the brackets 149.

To facilitate movement of this subassembly in and out of the frame 176, spaced roller devices 188 are mounted at the sides of the plate 52 for engaging guide rails 190 that are secured to the sides of the frame 176. When the subassembly is moved into position inside the frame 176, in which position the tube 170 is centered beneath the chute 40 that is supported on the top 192 of the frame 176, it may be releasably locked, as by suitable locking means between the plates 180, 192.

Figure 10:
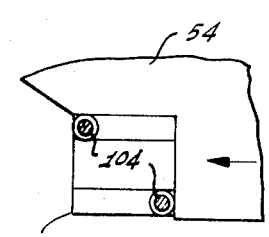
FIG. 10 is a fragmentary top plan view, taken in the direction indicated by the arrow 10 in FIG. 8, of a capacitor under test, and showing the positions of the test contacts.

Further in accordance with this invention, the block 90 which carries the contacts 104 and the shuttle plate 54 (see FIGS. 3 and 4) are removable, and are paired in accordance with the sizes of the chips to be tested. In this connection, FIGS. 10 and 15 illustrate a shuttle plate 54 shaped to receive and move square chips. The outer end of the shuttle plate 54 is notched, as indicated at 194 in FIG. 15, so that the sides of the notch are at right angles and the side of the notch along which the chips move into the path of the shuttle plate is substantially the dimension of one side of the chip. Correspondingly, a block 90 for such chips is used wherein the test contacts 104 are spaced so as to engage the respective conductive coatings of the chips.

For rectangular chips, a shuttle plate is provided (see FIG. 16) which is notched, as at 196, to the dimensions of a side and an end of the chips. Correspondingly, a block 90 is used wherein the test contacts 104 are positioned to engage the conductive coatings of such longer chips.

Referring to FIGS. 3 and 4, each such block 90 has identically located pins to fit the metal rods 98. Thus, the only difference between such blocks is the placement of the test contacts therein. As for a shuttle plate 54, it is removed from the base plate 60 by loosening the screws 56. Shuttle plates differ only in the dimensions of their notches. Thus, each shuttle plate has identically spaced threaded openings for the screws 56.

The test contacts embedded in each block 90 are arranged so it is impossible for them to engage the same conductive coating of a chip. For square chips, and referring to FIG. 15, the best contacts are arranged to contact prints at the ends of a diagonal of each chip. This means that regardless of the orientation of a square chip, the test contacts always come to rest on the respective conductive coatings. In this connection, FIG. 15 shows a chip being urged against the edge of the shuttle plate while a preceding chip has been carried in the notch 194 to test position. However, the waiting chip is oriented so that its conductive coatings are displaced 90° from those of the chip under the test contacts 104. This will be the orientation of the conductive coatings of the waiting chip when the shuttle plate retracts and it moves into the path of the shuttle plate and is carried to the test position to be engaged by the test contacts 104. A chip thus oriented is shown in FIG. 10, which shows that the test contacts 104 nevertheless engage the respective conductive coatings. For rectangular chips, spacing the test contacts to engage diagonally spaced points also insures against their engaging the same conductive coating.

The advantage of this arrangement can readily be understood with reference to FIG. 17 in which the test contacts 104 are spaced apart the distance of a side of a square chip, and along a line transverse to the path of movement of the shuttle plate 54. As shown, such arrangement of the test contacts 104 is one in which chips may be oriented so that the contacts come to rest on the same conductive coating. While such a chip may be a perfectly good capacitor, it would nevertheless be rejected with the arrangement of contacts shown in FIG. 16.

While the invention has been described with reference to measurement of capacitance only, it is readily adapted to provide information on other electrical characteristics of capacitor chips. For example, it may be desired to obtain a measurement of the dissipation factor of each chip, along with the measurement of its capacitance. In such case, the measuring network 143 may be provided with suitable logic circuitry responsive to the voltage across the capacitor under test to derive digital data representative of the dissipation factor. As wtih the front panel displays of capaciance readings, similar visual presentations may be provided for the dissipation factor.

From the foregoing, it will be apparent that various modifications can be made in the arrangements and operations of parts illustrated and described without departing from the spirit and scope of the invention. In this regard, the system will be recognized as adaptabe for testing and sorting other electrical elements than capacitors, such as resistors, diodes, or even a combination of elements connected together on a substrate.

I claim:
1. In combination:
   a pair of spaced test contacts to engage an electrical element to be tested;
   electrical measuring means connected to said contacts for developing signals representing the value of an electrical characteristic of an element engaged by said contacts;

means for automatically conveying such elements in succession to a location adjacent to said contacts,
    said conveying means being adapted to cause each element moved thereby to said location to move the immediately preceding element out of said location, wherein said conveying means includes a shuttle plate slidable between two positions on a base plate,
    one end of the shuttle plate in one position permitting an electrical element to move onto the base plate and into the path of said one end of the shuttle plate,
    said one end of the shuttle plate in its other position being spaced from an edge of said base plate a distance substantially equal to a predetermined dimension of the electrical elements to be tested;

means operable upon each operation of said conveying means to momentarily move said contacts to a position to engage spaced portions of an element at said location so as to permit said measuring means to operate;

first receptacle means for elements exhibiting predetermined values of said electrical characteristic;

second receptacle means for elements exhibiting values of said electrical characteristic outside the range of said predetermined values;

and sorter means responsive to the signals developed from each element and operable upon the element bing moved out of said location to direct it to one of said receptacle means in accordance with the values represented by the signals.

2. The combination fo claim 1, including:
a chute with one end adjacent said edge of the base plate into which the elements pass when they are moved out of said location,
    said second receptacle means including a bin spaced vertically below the other end of said chute to receive elements passed through said chute.

3. The combination of claim 2, including:
a tube;
and means in said sorter means to move said tube between the other end of said chute and said first receptacle.

4. The combination of claim 3, wherein said tube moving means is operable from signals developed by said measuring means which are representative of said predetermined values.

5. The combination of claim 2, including
a plurality of bins for said first receptacle means;
tube means; and
means in said sorter means to operate said tube means to direct elements passed through said chute to one of said bins.

6. The combination of claim 5, wherein said tube means includes a flexible tube for each bin, each tube being connected at one end to its bin;
and respective means in said sorter means connected to the remaining ends of said tubes and operable to move the associated remaining tube end into alignment with the other end of said chute.

7. The combination of claim 6,
including means coupled to said measuring means, and responsive to signals representing a value within the range of said predetermined values, to move one of said remaining tube ends into alignment with said chute simultaneously with movement of said one end of the shuttle plate to said one edge of said base plate.

8. The combination of claim 7, wherein said conveying means includes vibrator means for moving elements toward said base plate;
and element impeding means operable when said shuttle plate is in said one position to permit only one element to move into the path of said shuttle plate.

9. The combination of claim 8, wherein said element impeding means includes a pin for movement toward and away from the path for the elements;
means normally holding said pin so that one end thereof is in position to engage an element adjacent the shuttle plate, thereby to prevent movement of elements towards said shuttle plate;
and means for momentarily lifting said pin when said shuttle plate moves from said one to said second position thereof.

10. The combination of claim 9, wherein the shuttle plate, contacts, tubes and pin are coupled to respective electrically operable air valves.

11. In combination:
a shuttle plate slidable on a base plate so that one end of said shuttle plate moves between first and second positions on said base plate,
    said one end in said first position being spaced from one edge of the base plate a distance equal to a dimension of an electrical element of predetermined size,
    said one end in said second position being adapted to permit such an electrical element to be moved onto said base plate, thereby to be moved by said shuttle plate to said one edge of said base plate;
means normally holding said shuttle plate with said one end in said second position;
and means for momentarily moving said shuttle plate to place said one end in said first position.

12. The combination of claim 11, including
a pair of test contacts adjacent said one edge of said base plate;
means supporting said contacts for movement toward and away from said base plate,
    said contacts in the position nearest said base plate being adapted to engage spaced portions of an electrical element moved to said one edge of the base plate; and
means operable upon said one end of said shuttle plate positioning an electrical element at said one base plate edge to momentarily move said contacts to their lower position.

13. The combination of claim 12, wherein
said supporting means includes a nonconductive block,
    said contacts being secured in and extending from said block;
and a spring member carried by said block and extending between said contacts,
    said spring member extending past said contacts when said contacts are farthest from said base plate, so as to engage an electrical element and hold it against said base plate throughout movement of said block and contacts toward said base plate.

14. The combination of claim 13, wherein, for electrical elements in the form of square ceramic capacitors, said contacts are positioned to engage diagonally opposed corner portions of the elements.

15. In combination:
a generally horizontal plate having an opening therein through which to pass elements to be sorted into bins;
tubes disposed below said plate;
a respective means supporting the upper end of each tube for movement into and out of alignment with said opening,
    wherein said tubes are flexible;
respective means associated with each tube to move its upper end into position to receive an element passing through said opening;
and respective bins coupled to the remaining ends of said tubes, said remaining ends of said tubes being in fixed spaced relation to said bins.

16. The combination of claim 15 including a second plate below and in fixed spaced relation to the first-mentioned plate, said second plate having openings aligned with the respective bins, said remaining end of each tube secured in alignment with a respective opening in said second plate.

17. The combination of claim 16, including a third plate below and in fixed spaced relation to said second plate, said bins resting on said third plate, said second plate having a central opening aligned with the opening in said first-mentioned plate; and a bin resting on said third plate in alignment with the central opening in said second plate.

18. The combination of claim 17, including a frame having a floor beneath said third plate, said third plate, said floor supporting spaced rails; and roller means between the lower surface of said third plate and said rails.

References Cited
UNITED STATES PATENTS

| | | | |
|---|---|---|---|
| 2,999,587 | 9/1961 | Campbell | 209—81 X |
| 3,409,127 | 11/1968 | Aiken et al. | 209—81 X |
| 3,363,179 | 1/1968 | McCutcheon | 209—81 X |

ALLEN N. KNOWLES, Primary Examiner

U.S. Cl. X.R.

209—74, 81